United States Patent
Noritake et al.

(10) Patent No.: US 12,467,624 B2
(45) Date of Patent: Nov. 11, 2025

(54) PREMIXING APPARATUS

(71) Applicant: RINNAI CORPORATION, Aichi (JP)

(72) Inventors: Katsuya Noritake, Aichi (JP); Takuya Miura, Aichi (JP)

(73) Assignee: RINNAI CORPORATION, Aichi (JP)

( * ) Notice: Subject to any disclaimer, the term of this patent is extended or adjusted under 35 U.S.C. 154(b) by 520 days.

(21) Appl. No.: 18/060,229

(22) Filed: Nov. 30, 2022

(65) Prior Publication Data
US 2023/0258330 A1 Aug. 17, 2023

(30) Foreign Application Priority Data
Feb. 17, 2022 (JP) .................. 2022-022682

(51) Int. Cl.
*F23D 14/02* (2006.01)
*C10K 3/06* (2006.01)
*C10L 3/00* (2006.01)

(52) U.S. Cl.
CPC ............... *F23D 14/02* (2013.01); *C10K 3/06* (2013.01); *C10L 3/003* (2013.01); *C10L 2290/06* (2013.01); *C10L 2290/145* (2013.01); *C10L 2290/24* (2013.01)

(58) Field of Classification Search
CPC ........... F23D 14/02; C10K 3/06; C10K 3/003; C10L 2290/06; C10L 2290/145; C10L 2290/24
USPC ....................................................... 431/354
See application file for complete search history.

(56) References Cited

U.S. PATENT DOCUMENTS

| 2011/0313637 A1* | 12/2011 | Yamashita | F24H 9/2085 73/114.02 |
| 2016/0178240 A1* | 6/2016 | Okada | F24H 15/31 137/78.4 |
| 2021/0041100 A1 | 2/2021 | Noritake et al. | |

FOREIGN PATENT DOCUMENTS

| JP | 2018-179447 A | 11/2018 |
| JP | 2021-025722 A | 2/2021 |

* cited by examiner

*Primary Examiner* — Avinash A Savani
(74) *Attorney, Agent, or Firm* — Future IP LLC; Tomoko Nakajima

(57) ABSTRACT

In a premixing apparatus that mixes a fuel gas with air and supplies an air-fuel mixture to a burner through a fan, includes a main valve, a zero governor, and a variable throttle valve which are interposed from an upstream side downward in sequence in a gas supply passage, of which an downstream end is connected to a gas suction part that is provided in an air supply passage on an upstream side of a fan, and carries out a first control that regulates an opening degree of the variable throttle valve so that an excess air ratio of the air-fuel mixture, which is indexed based on a flame current that is detected by a flame rod which is exposed in flames of the burner, and a second control that, at time of a post-purge operation, if the flame rod detects the flame current, it will be decided that an open trouble of the main valve occurs and the opening degree of the throttle valve will be tightened till a minimum opening-degree which is set so that the burner is extinguished.

2 Claims, 2 Drawing Sheets

PREMIXING APPARATUS

TECHNICAL FIELD

The invention relates to a premixing apparatus that mixes a fuel gas with air and supplies an air-fuel mixture to a burner through a fan.

BACKGROUND ART

There has been conventionally known a premixing apparatus that includes: an air supply passage on an upstream side of the fan; a gas supply passage of which a downstream end is connected to a gas suction part that is arranged in the air supply passage; a main valve and a zero governor that regulates a secondary gas pressure to an atmospheric pressure, which are interposed in the gas supply passage from an upstream side downward in sequence (See patent document No. 1, for example). Here, a supply amount of the fuel gas varies depending on a differential pressure between the atmospheric pressure that is the secondary gas pressure and a negative pressure that acts upon the gas suction part. Since the negative pressure that acts upon the gas suction part varies depending on a fan rotational speed, a supply amount of the fuel gas varies in proportion to the fan rotational speed, i.e., a supply amount of air. Accordingly, by controlling the fan rotational speed corresponding to a required combustion amount, the air-fuel mixture in an amount corresponding to the required combustion amount is supplied to the burner, and an excess air ratio of the air-fuel mixture (a primary air amount/a stoichiometric air amount) becomes constant.

Incidentally, even if a same kind of a gas is used as the fuel gas, a calorific amount (Wobbe Index) of the fuel gas sometimes fluctuates with time. In the above-mentioned premixing apparatus, even in a case where the calorific amount of the fuel gas fluctuates, a ratio of the supply amount of the fuel gas to the supply amount of the air remains constant. Therefore, the excess air ratio of the air-fuel mixture varies due to fluctuation of the calorific amount of the fuel gas, and as a result, poor combustion occurs.

Then, there has been conventionally known another premixing apparatus that includes: a variable throttle valve that is interposed in a portion, on a downstream side of the zero governor, of the gas supply passage; a flame rod that is exposed in flames of the burner; and a controller, wherein the controller carries out a control that regulates an opening degree of the variable throttle valve so that the excess air ratio of the air-fuel mixture, which is indexed based on a flame current that is detected by the flame rod, becomes a predetermined value (See patent document No. 2, for example).

Incidentally, even if an open trouble of the main valve (a trouble that the main valve is left open) occurs, since the fuel gas is not sucked as long as the fan is not driven, at time of fan suspension, emission of the fuel gas cannot happen. However, when combustion suspension command is given and a post-purge operation in which the fan is driven in a state where the main valve is closed, if the open trouble of the main valve occurs, the fuel gas is emitted.

REFERENCE

Patent document No. 1: JPA 2018-179447
Patent document No. 2: JPA 2021-025722

SUMMARY OF INVENTION

Technical Problem

In the light of the above-mentioned problem, the invention provides a premixing apparatus that can suppress emission of a fuel gas at time of a post-purge operation in a state where an open trouble of a main valve occurs.

Solution to Problem

In order to solve the above-mentioned problem, the invention presupposes a premixing apparatus that mixes a fuel gas with air and supplies an air-fuel mixture to a burner through a fan. The premixing apparatus includes: an air supply passage on an upper side of the fan; a gas supply passage of which a downstream end is connected to a gas suction part that is arranged in the air supply passage; a main valve, a zero governor that regulates a secondary gas pressure to an atmospheric pressure, and a variable throttle valve, which are interposed in the gas supply passage, from an upstream side downward in sequence; a flame rod that is exposed in flames of the burner; and a controller, wherein the controller is configured to carry out a first control that regulates an opening degree of the variable throttle valve so that an excess air ratio of the air-fuel mixture, which is indexed based on a flame current that is detected by the flame rod, becomes a predetermined value. In the premixing apparatus, the controller is configured to carry out a second control that, when a combustion suspension command is given and a post-purge operation in which the fan is driven in a state where the main valve is closed is performed, if the flame rod does not detect the flame current, the opening degree of the variable throttle valve will be held at an opening degree just before the combustion suspension command is given, and if the flame rod detects the flame current, decision that an open trouble of the main valve occurs will be made and the opening degree of the variable throttle valve will be tightened till a minimum opening-degree that is set so that the burner is extinguished.

Here, at time of the post-purge operation at the state of the open trouble of the main valve occurs, since the fuel gas is sucked and combustion at the burner continues, the flame rod detects the flame current. According to the invention, when the post-purge operation is performed, in a case where the flame rod detects the flame current, since the opening degree of the variable throttle valve is tightened till the minimum opening-degree, not only the burner is extinguished but also emission of the fuel gas is suppressed. Additionally, in the invention, if the main valve is not in the open trouble and at the post-purge operation, the flame rod does not detect the flame current, the opening degree of the variable throttle valve will be held at an opening degree just before the combustion suspension command is given. Therefore, at time of next ignition, opening-degree regulation of the variable throttle valve based on the excess air ratio of the air-fuel gas will be unnecessary and prompt igniting motion will be possible. Further, since the variable throttle valve and the flame rod that are provided in order to keep the excess air ratio of the air-fuel mixture to an appropriate value can be usable as a gas-emission preventing device, another part will be unnecessary and this will make advantageous in cost.

In the invention, it is desirable that the minimum opening-degree of the variable throttle valve is a fully closed opening-degree that cuts off flows of the fuel gas. According to this manner, at the time of the post-purge operation in the state where the open trouble of the main valve occurs, emission of the fuel gas will be able to be certainly prevented.

DESCRIPTION OF EMBODIMENTS

Figure 1:
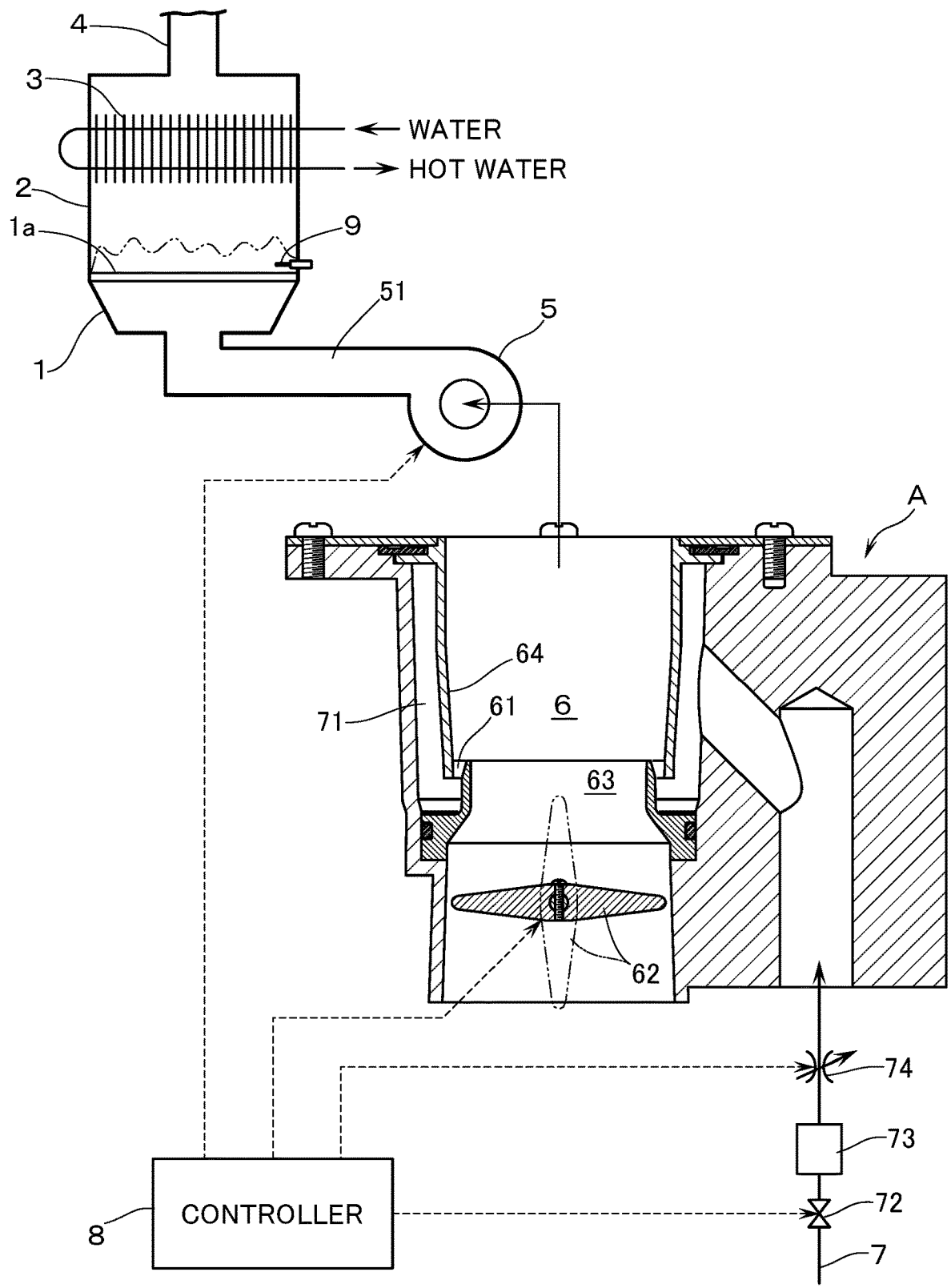
FIG. 1 is an explanation diagram that shows a premixing apparatus of an embodiment according to the invention and a combustion apparatus that includes a burner to which an air-fuel mixture from the premixing apparatus is supplied.

A combustion apparatus that is shown in FIG. 1 is a heat resource apparatus that includes a totally aerated combustion burner 1, a combustion box 2 that encloses a combustion space of an air-fuel mixture which ejects from a combustion surface 1a of the burner 1, and a heat exchanger 3 that is disposed in the combustion box 2. A combustion gas that is generated by combustion of the air-fuel mixture heats the heat exchanger 3 and thereafter is exhausted outside through a exhaust tube 4 that is connected to an end portion of the combustion box 2. Additionally, by a premixing apparatus A of an embodiment according to the invention, a fuel gas is mixed with air and the air-fuel mixture is supplied to the burner 1 through a fan 5 and an air-fuel mixture supply passage 51 on a downstream side of the fan 5.

The premixing apparatus A includes an air supply passage 6 on an upstream side of the fan 5, a gas supply passage 7 that supplies the fuel gas, the fan 5, and a controller 8 that consists of a microcomputer which controls a butterfly valve 62, a main valve 72 and a variable throttle valve 74 that will be mentioned below. A downstream end of the gas supply passage 7 is connected to a gas suction part 61 that is arranged in the air supply passage 6. In a portion of the air supply passage 6, which is adjacent to an upstream side of the gas suction part 61, a venturi part 63 with a diameter smaller than that of a portion in which the butterfly valve 62 is arranged. A portion of the air supply passage 6, which is adjacent to a downstream side of the venturi part 63, is enclosed by a tubular part 64 with a diameter larger than that of the venturi part 63. Then, a downstream end portion of the venturi part 63 is inserted into an upstream end portion of the tubular part 64 while leaving an annular clearance and the gas suction part 61 is constituted by the clearance. At the downstream end of the gas supply passage 7, a gas chamber 71 that communicates with the gas suction part 61 is provided in a manner to enclose the tubular part 64. Additionally, in the gas supply passage 7, from an upstream side downward in sequence, the main valve 72, a zero governor 73 that regulates a secondary gas pressure to an atmospheric pressure, and the variable throttle valve 74 are interposed.

An amount of the fuel gas that is supplied through the gas suction part 61 varies depending on a differential pressure between the atmospheric pressure that is the secondary gas pressure and a negative pressure that acts upon the gas suction part 61. Here, the negative pressure that acts upon the gas suction part 61 varies with a rotational speed of the fan 5. Therefore, a supply amount of the fuel gas varies in proportion to the rotational speed of the fan 5, i.e., a supply amount of air. Additionally, a ratio of the supply amount of the fuel gas to the supply amount of the air varies with an opening degree (an amount of a clearance between a valve body and a valve seat that are not shown in any of figures) of the variable throttle valve 74. By changing the opening degree of the variable throttle valve 74 to a predetermined standard opening degree corresponding to a kind of a gas to be used, an excess air ratio of the air-fuel mixture becomes a predetermined appropriate value (for example, 1.3). Further, by controlling the rotational speed of the fan 5 corresponding to a required combustion amount (a combustion amount that is necessary to deliver hot water at a set temperature), the air-fuel mixture with the appropriate value of the excess air ratio and in amount corresponding to the required combustion amount is supplied to the burner 1.

On the other hand, in order that poor combustion does not occur due to entry of a wind into the exhaust tube 4, that is, in order to secure a wind-resistant performance, a lower-limit rotational speed of the fan 5 cannot be set to be considerably slow. Further, in a case where the required combustion amount decreases a predetermined value that corresponds to the lower-limit rotational speed, or smaller, air in amount corresponding to the required combustion amount cannot be supplied.

Then, in a portion, on the upstream side of the gas suction part 61, of the air supply passage 6, in order to switch a flow resistance of the portion in question to two stages of which one is large and the other is small, the butterfly valve 62 that can be switched to a closed posture that is shown by a full line and an opened posture that is shown by an imaginary line in FIG. 1 is disposed. And, in a case where the required combustion amount decreases to the above-mentioned value or smaller, by switching the butterfly valve 62 to the closed posture, the flow resistance of the air supply passage 6 makes large so that the air in amount corresponding to a required combustion amount of the predetermined value or smaller can be supplied without causing the rotational speed of the fan 5 to decrease to a lower-limit rotational speed or slower. Provided that the flow resistance is only makes large by the switching the butterfly valve 62 to the closed posture, since the negative pressure in the air supply passage 6 increases, the supply amount of the fuel gas becomes considerably excessive and the excess air ratio of the air-fuel mixture that is supplied to the burner 1 becomes below the appropriate value. Therefore, in a case where the required combustion amount is relatively small, a combustion capacity is changed to a small capacity state in which not only the flow resistance of the air supply passage 6 makes large by switching the butterfly valve 62 to the closed posture but also the variable throttle valve 74 is tightened from the standard opening-degree by a predetermined opening-degree and the flow resistance in a portion, on a downstream side of the zero governor 73, of the gas supply passage 7 makes large, so that the air-fuel mixture with the appropriate value of the excess air ratio and in amount corresponding to the relatively small required combustion amount can be supplied to the burner 1. Additionally, in a case where the required combustion amount is relatively large, the combustion capacity is changed to a large capacity state in which not only the flow resistance of the air supply passage 6 makes small by switching the butterfly valve 62 to the opened posture but also the throttle valve 74 is opened till the standard opening-degree and the flow resistance in the portion, on the downstream side of the zero governor 73, of the gas supply passage 7 makes small, so that the air-fuel mixture with the appropriate value of the excess air ratio and in amount corresponding to the relatively large required combustion amount can be supplied to the burner 1.

Further, even if a same kind of a gas is used as the fuel gas, a calorific amount (Wobbe Index) sometimes varies with time. In this case, if a ratio of the supply amount of the fuel gas to the supply amount of the air is constant, the excess air ratio of the air-fuel mixture fluctuates due to fluctuation of the calorific amount of the fuel gas, the poor combustion will occur.

Here, a flame current that is detected by a flame rod 9 which is provided for flame detection and is exposed in flames of the burner 1 is a maximum when the excess air ratio of the air-fuel mixture is 1.0 and decreases accompanied by an increase or a decrease of the excess air ratio from 1.0. Therefore, the excess air ratio of the air-fuel mixture can be indexed based on the flame current that is detected by the flame rod 9. Then, the controller 8 carries out a control such a first control as regulates the opening degree of the variable throttle valve 74 so that the excess air ratio of the air-fuel mixture that is indexed based on the flame current value becomes the predetermined value.

Figure 2:
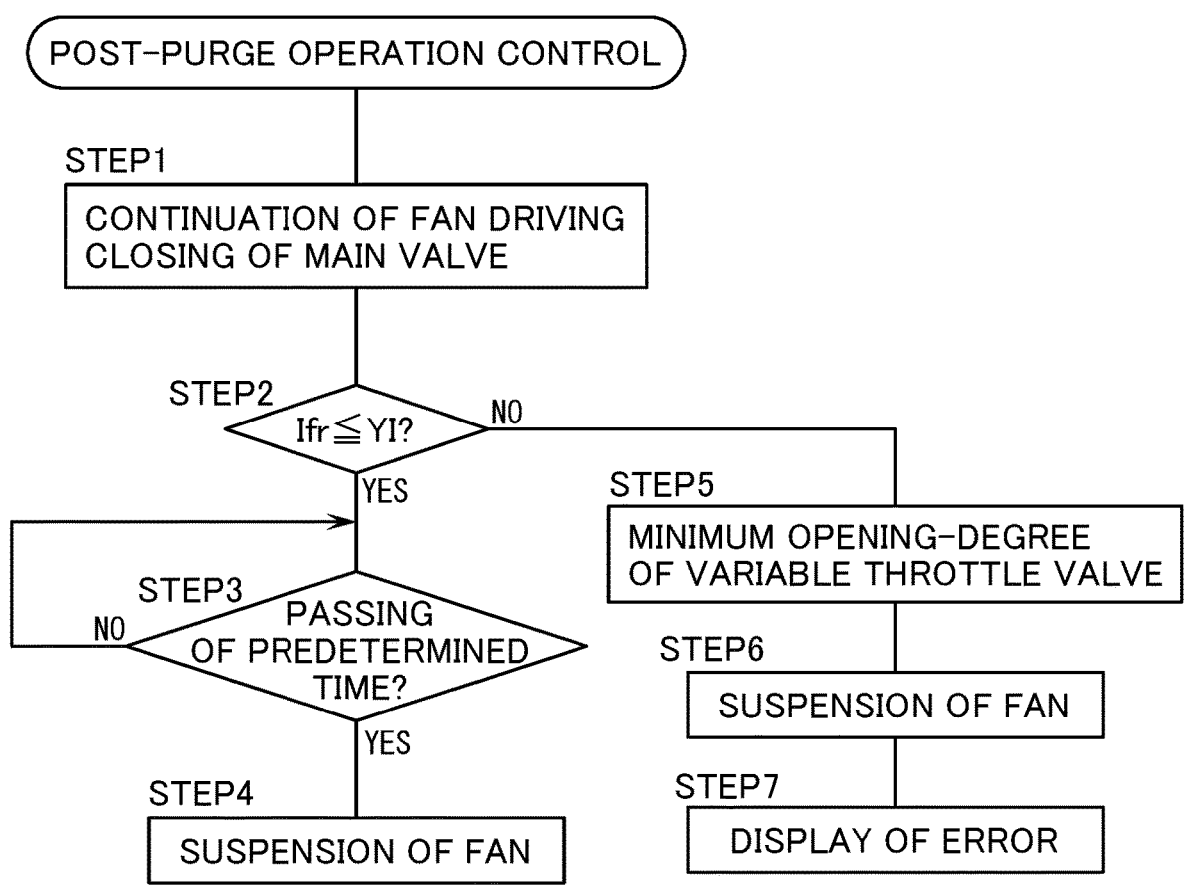
FIG. 2 is a flow diagram that shows contents of a second control which a control device of the premixing apparatus of the embodiment carries out when a combustion suspension command is given.

Additionally, when delivering hot water is suspended and a combustion suspension command is given, the controller 8 carries out a post-purge operation control such a second control as is shown in FIG. 2. In the post-purge operation control, first, in STEP 1, the main valve 72 is closed while continuing driving of the fan 5. Here, if an open trouble of the main valve 72 occurs, the fuel gas will be sucked from the gas suction part 61 by suction power of the fan 5, the air-fuel mixture will be supplied to the burner 1, combustion at the burner 1 will continue, and the flame rod 9 will detect the flame current. Then, in STEP 2, distinction whether the flame current value Ifr that is detected by the flame rod 9 becomes a predetermined threshold YI as a standard for extinction or lower. Then, if Ifr≤YI, in STEP 3, distinction whether predetermined time goes by and when the predetermined time goes by, in STEP 4, the fan 5 will be suspended and the post-purge operation will be suspended.

On the other hand, if Ifr>YI, it will be decided that the open trouble of the main valve 72 has occurred, in STEP 5, the opening degree of the variable throttle valve 74 will be tightened till a minimum opening-degree that is set so that the burner 1 is extinguished. Incidentally, the minimum opening-degree is specifically set so that the valve body comes into contact with the valve seat, the supply amount of the fuel gas becomes smaller than a combustion-limit, and the burner 1 is extinguished. Subsequently, in STEP 6, not only the fan 5 is suspended but also, in STEP 7, an error display that displays that the open trouble of the main valve 72 has occurred.

According to the above-mentioned post-purge operation control, when the post-purge operation is performed, if the flame rod 9 detects the flame current (in a case of Ifr>YI), since the opening degree of the variable throttle valve 74 will be tightened till the minimum opening-degree, not only the burner 1 will be extinguished but also emission of the fuel gas will be suppressed. On the other hand, in a case where the open trouble of the main valve 72 does not occur and, at time of the post-purge operation, the flame rod 9 does not detect the flame current (in a case of Ifr≤YI), since the control that changes opening degree of the variable throttle valve 74 is not carried out, the opening degree of the variable throttle valve 74 will be held at an opening degree just before the combustion suspension command is given. Therefore, at a time of next ignition, opening-degree regulation of the variable valve 74 based on the excess air ratio of the air-fuel mixture will be unnecessary and prompt ignition motion will be possible. Further, since the variable throttle valve 74 and the flame rod 9 that are provided in order to keep the excess air ratio of the air-fuel mixture to the appropriate value are usable as a gas-emission preventing device at time of the open trouble of the main valve 72, this will make advantageous in cost reduction.

Additionally, the variable throttle valve 74 may be constituted by one which has a sealing member such a rubber as is fitted to one of the valve body and the valve seat. In this case, since the valve body comes into contact with the valve seat not directly by metal touch (i.e., metal-to-metal contact) but through the sealing member (i.e., with the sealing member in-between), the variable throttle valve 74 can be tightened till a fully closed opening-degree, which cuts off flows of the fuel gas. Then, in STEP 5, it is desirable that the opening degree of the variable throttle valve 74 is tightened till the fully closed opening-degree. According to this manner, at time of the post-purge operation in the state where the open trouble of the main valve 72 occurs, the emission of the fuel gas will be able to be certainly prevented.

The embodiment of the invention is explained referring to figures in the above. On the other hand, the invention is not restricted to the above-mentioned embodiment. The invention may be implemented with some modifications within a range that the modifications deviate from purport of the invention.

EXPLANATION OF SYMBOLS

A Premixing apparatus
1 Burner
5 Fan
6 Air supply passage
61 Gas suction part
7 Gas supply passage
72 Main valve
73 Zero governor
74 Variable throttle valve
8 Controller
9 Flame rod

What is claimed is:

1. A premixing apparatus that mixes a fuel gas with air and supplies an air-fuel mixture to a burner through a fan, comprising:
an air supply passage on an upper side of the fan;
a gas supply passage of which a downstream end is connected to a gas suction part that is arranged in the air supply passage;
a main valve, a zero governor that regulates a secondary gas pressure to an atmospheric pressure, and a variable throttle valve, which are interposed in the gas supply passage, from an upstream side downward in sequence;
a flame rod that is exposed in flames of the burner; and
a controller,
wherein the controller is configured to carry out a first control that regulates an opening degree of the variable throttle valve so that an excess air ratio of the air-fuel mixture, which is indexed based on a flame current that is detected by the flame rod, becomes a predetermined value,
wherein:
the controller is configured to carry out a second control that, when a combustion suspension command is given and a post-purge operation in which the fan is driven in a state where the main valve is closed is performed, if the flame rod does not detect any of flame currents, the opening degree of the variable throttle valve will be held at an opening degree just before the combustion suspension command is given, and if the flame rod detects the flame current, decision that an open trouble of the main valve occurs will be made and the opening degree of the variable throttle valve will be tightened till a minimum opening-degree that is set so that the burner is extinguished, wherein the air supply passage is provided with a butterfly valve that switches a flow resistance of the air supply passage so that, when a required combustion amount is equal to or smaller than a predetermined value, air in an amount corresponding to the required combustion amount is supplied without causing a rotational speed of the fan to decrease to a lower-limit rotational speed or slower.

2. The premixing apparatus as claimed in claim 1, wherein the minimum opening-degree of the variable throttle valve is a fully closed opening-degree that cuts off flows of the fuel gas.

* * * * *